July 19, 1932.     A. H. AVERY     1,868,041
SHOE FILLER PIECE
Filed Aug. 13, 1927
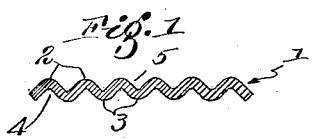
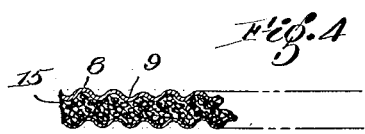
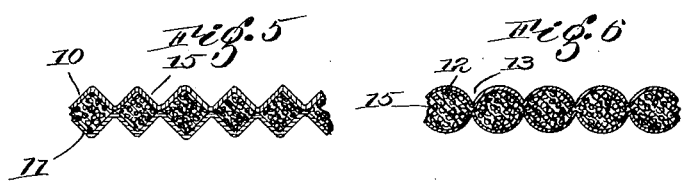
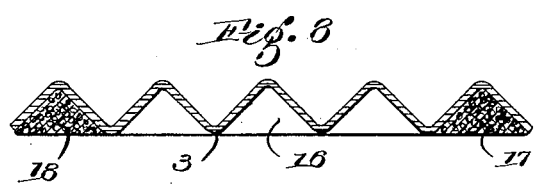
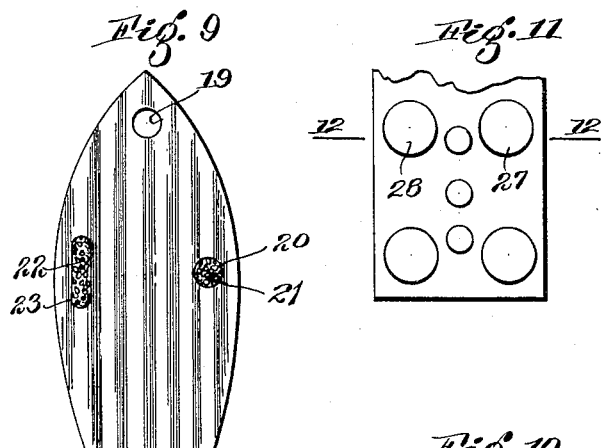
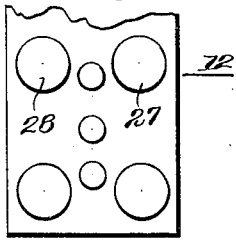
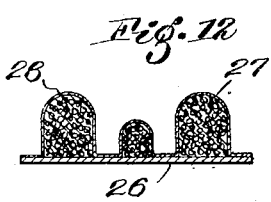
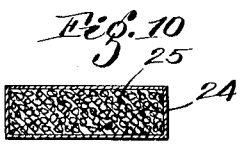
Inventor:
Alfred H. Avery,
by Roberts Cushman Woodberry
Attys.

Patented July 19, 1932

1,868,041

UNITED STATES PATENT OFFICE

ALFRED H. AVERY, OF MALDEN, MASSACHUSETTS, ASSIGNOR TO NORTH AMERICAN CHEMICAL COMPANY, OF BOSTON, MASSACHUSETTS, A CORPORATION OF MASSACHUSETTS

SHOE FILLER PIECE

Application filed August 13, 1927. Serial No. 212,747.

This is a species of the expansible and preferably spreadable sheet piece filler for shoe bottoms as broadly set forth in Letters Patent of the United States No. 1,793,340 granted to Andrew Thoma February 17, 1931, which contains the basic claims. That patent discloses shoe-bottom filler material manufactured in a self-sustaining and shape maintaining piece. A characteristic feature of one form of this piece is that it comprises a multilayer or laminated structure having a spreadable layer of filler material and a supporting layer or cover or skin, the latter usually being fixed in shape and extent as a sheet and being primarily intended to reinforce the spreadable filler layer, especially when in a shoe and the plastic or spreadable layer has been spread. This reinforcing layer may also be made extensible by stretching.

My improvement resides in providing a filler piece having capacity to expand because of its shape. It may also have in addition an expansible layer. Further minor features are hereinafter set forth. The expansion is preferably provided by corrugating the filler piece or by making one or both of the supporting layers (when that form of a piece is provided which contains a plastic layer between top and bottom supporting skins or covers) corrugated, so that the expansion takes place mechanically simply by flattening down the corrugated filler piece. In the latter case the top and bottom layers or skins are made in corrugated shape, as an article of manufacture, and hence have a definite or predetermined area, and whether lamellar or not, the corrugated piece becomes more extended simply by being pressed down flat in the shoe or, in other words, has a capacity of predetermined expansion in area as distinguished from spreading, stretching or in any other way becoming extended. The intermediate plastic layer, if any, is simultaneously expanded but not spread by the same flattening movement and then when flat or nearly so continues to move or spread and extend by the further pressure according to the requirements of the shoe-bottom cavity.

In the drawing, illustrative of my invention as embodied in various forms,

Fig. 1 is a diagrammatic vertical cross-section showing the general construction of my filler piece in its simplest form;

Fig. 2 shows the same piece in a shipping condition;

Fig. 3 is an edge view similar to Fig. 1 showing the combination of an expansible cover piece which is not extensible or spreadable and an intermediate spreadable layer;

Fig. 4 is a similar view showing a different arrangement of corrugations;

Figs. 5 and 6 are similar views showing further embodiments;

Fig. 7 is a top plan of a filler piece of the general type illustrated in Fig. 1 but containing small areas of spreadable filler located at those portions of the piece which usually require indeterminate areas to correspond to varying shoe-bottom cavities;

Fig. 8 is a transverse section to larger scale, substantially on the line 8—8 of Fig. 7;

Fig. 9 is a view similar to Fig. 7 but showing a further construction in which the filler piece proper has openings for the reception of insertible patches or plugs containing spreadable filler;

Fig. 10 is a typical cross-section to large scale of a filler patch or plug such as may be used in the filler piece of Fig. 9;

Fig. 11 is a fragmentary plan view of a filler piece of a further modified kind; and Fig. 12 is a section on line 12—12 of Fig. 11.

The filler piece 1 as shown in Fig. 1 consists simply of a piece of any suitable sheet or sheeted material inclusive of any of the kinds mentioned in the above applications, excepting that said material is not normally expansible and is not extensible in the sense of being stretchable but is simply corrugated with opposite ridges 2, 3 at the top and bottom respectively of A-shaped elevations 4 and depressions 5. This form of corrugated piece is readily compacted as shown in Fig. 2 for shipment simply by crowding it solidly together within the limits of its capacity to fold compactly. It also lends itself to nesting one piece on top of another for convenient shipping. Instead of the particular form of corrugation shown in Fig. 1, it may be corrugated in any other way, for example, in the more wavy form of corrugation as shown at 6, 7 in Fig. 3, or in the less wavy form indicated at 8, 9 Fig. 4. Fig. 4 also shows a structure in which the opposite corrugations are not in true alignment with each other which has some advantages and some disadvantages.

In Fig. 5 I have shown a filler piece composed of top and bottom layers 10, 11 having corrugations substantially like those shown in Fig. 1 but purposely placed in opposite phase relation as distinguished from the arrangement shown in Fig. 3. In Fig. 6 I have shown a still further form of corrugation 12, 13, the opposite or top and bottom layers or skins being arranged opposite each other as in Fig. 5 and having curved corrugations forming something in the nature of tubes whereas Fig. 5 shows corrugations of rectangular cross-section. In the construction of the filler piece of Figs. 3, 4, 5 and 6, I provide an intermediate spreadable layer 15. The layer 15 may consist of any of the kinds of filler material referred to in said Thoma Patent No. 1,793,340.

Referring now to Fig. 7, in which a filler piece corrugated in accordance with any of the before mentioned forms or constructions is employed (for example, the type of corrugation of Fig. 1), I have shown limited areas 16, 17, 18 at the toe and the opposite sides provided with spreadable filler material which may be held between two expansible or corrugated skins or, especially if the skin or cover piece is relatively thick, the small portions or areas of spreadable filler may simply be secured thereto in any convenient or desirable shape and manner, as illustrated for example in Fig. 8.

In Fig. 9 I have shown a similar expansible filler piece by which I mean that it is corrugated or provided with a wrinkled shape so as to expand by flattening out, and in this I provide holes wherever desired and of whatever shape may be required. Three of these holes are herein shown for purposes of illustration and explanation. Thus I illustrate a hole 19 at the toe (shown as empty), a similar hole 20 at one side containing shoe filler material 21, and an elongated hole or opening 22 at the opposite side also containing shoe filler material 23.

In Fig. 10 I show a plug or patch 25 of filler that has been removed from the hole 19, said figure being greatly enlarged to show the details of one way of enclosing normally sticky filler material so that it will not be externally sticky in the filler piece during packaging and shipping. The plug or patch 25 shown in Fig. 10 is round to fit the hole 19, but if it were made for the hole 22 it would have an elongated cross-section. In other words, this patch will be made in shape round or angular to correspond to whatever the requirement. The sticky filler material is readily molded in a stick or column with the desired cross section and then the required small piece is cut off therefrom like a lozenge and dipped in any suitable crust-forming material or coated in any way to provide it with a dulled surface 24 and crowded into the hole for which it is intended. In practice this is all done by machinery but for convenience I have indicated the patch or plug 25 as surrounded by such thin protector 24 as tissue paper. Broadly the protector 24 is any material readily breakable or removable without dislodging the patch from its place in and as a part of the filler piece, such coating or protecting materials being further described in said Patent No. 1,793,340 and in the application of Andrew Thoma Serial No. 183,302, filed April 13, 1927.

In Figs. 11 and 12 I have shown a filler piece possessing some at least of the advantages of the arrangements previously described. This filler piece comprises a bottom layer or skin 26 and a top layer 27, the latter having upwardly directed hillocks of more or less wart-like form, providing cavities or chambers of greater or lesser capacity for the reception of spreadable filler material 28.

The skins or layers 26 and 27 may be of any suitable material, as above referred to in describing the constructions of Figs. 3 to 6, but I prefer to make the skin 27, at least, of some thin material easily frangible or capable of bursting when subjected to pressure, materials of this general character being more fully described in the application of Andrew Thoma, Serial No. 183,302 already referred to. In the same way the spreadable filler material 28 may be of any desired type, preferably such as described in the application just referred to.

Preferably, as shown, the hillocks or projections adjacent to the lateral edges of the filler piece are of greater capacity than those at its center, thus providing a greater amount of the spreadable filler adjacent to those deeper parts of the shoe cavity where it is most needed. When this piece is placed in the bottom of the shoe and subjected to pressure the bottom skin 26, if of sufficiently tough or thick material, may remain intact, but the upper skin 27 immediately begins to spread, expand or burst, releasing the enclosed masses 28 of filler and permitting the latter to spread beyond the edges of the skin 26 and into the crevices and irregularities of the shoe-bottom cavity.

In use the filler piece constructed according to any of the embodiments above set forth or any combination or variation thereof within the spirit and scope of the appended claims is placed in the shoe-bottom, preferably after pretempering, as explained in the said applications and is then subjected to pressure, said pressure preferably being applied through the sole and preferably consisting of the shoe-bottom leveling pressure all as set forth in application Serial No. 183,302 aforesaid. If a welt shoe is being filled, this pressure will ordinarily be applied by the usual positioning roll before the sole is put in place, this being the ordinary practice of filling welt shoes. It will be understood, however, that the final bottom leveling pressure may be relied upon for giving the filler its ultimate positioning as a filler layer.

When the layer is such that it has a capacity of definite expansion in area or, in other words, has a predetermined expansion in area and also a spreadable or distensible or otherwise indefinite or indeterminate capacity of expansion, the continued pressure extrudes the plastic or other extensible filler material beyond the area limits of the extensible but non-spreadable portion of the filler piece herein shown as the cover or covers and this extruded material conforms therefore accurately to the shape of the cavity of the shoe bottom. While I have shown a piece shaped to occupy the middle or central portion of the shoe bottom, my invention is not limited in this respect as it is intended to apply to any and all shapes of shoe filler pieces. The provision of a corrugated piece having a layer of plastic filler material has the further advantage of more readily and completely flowing or pressing out the plastic layer than if the filler piece were flat to start with. This is because the initial movement of the piece from its wrinkled or corrugated shape toward its flattened position carries with it bodily the plastic layer and the latter is gently but effectively given its initial spreading impulse by the opening or flattening of the corrugations and then, after it gets flattened out, the spreading is then completed by the same spreading pressure which would otherwise have been the only pressure effect. In the forms of filler pieces shown in Figs. 5 and 6 the initial spread or push on the plastic layer is still more effective.

As already stated, this application is subordinate to the Thoma Patent No. 1,793,340 and to the Thoma application Serial No. 183,302, filed April 13, 1927, but otherwise the claims herein are intended to have a broad construction not limited to any particular shape or arrangement except as particularly specified in any given claim.

I claim:

1. An article of manufacture, consisting of a shoe filler piece provided with a multilayer filler piece at least one layer of which is corrugated and another layer is spreadable.

2. An article of manufacture, comprising a shoe filler piece having a spreadable layer and opposite enclosing sheet-like layers corrugated in cross-section.

3. A shoe filler piece having opposite corrugated skins or covers with the corrugations so related as to form ribs opposite each other and depressions opposite each other, and plastic filler material occupying the space within said ribs.

4. An article of manufacture, consisting of a filler piece of corrugated shape and provided with distinct separated areas of spreadable filler.

5. An article of manufacture, consisting of a filler piece of corrugated shape and provided with distinct separated areas of spreadable filler located adjacent the opposite edges.

6. An article of manufacture, consisting of a shoe filler piece of corrugated shape and provided with distinct separated areas of spreadable filler located adjacent the opposite edges and toe.

7. An article of manufacture, consisting of a corrugated filler piece provided with holes filled with plastic filler.

8. A shoe filler piece, of relatively rigid supporting material, provided with an inset patch of plastic material confined in an easily ruptured coating and adapted when the coating is ruptured under pressure to spread in the shoe bottom cavity.

9. A shoe filler piece comprising a layer of relatively rigid supporting material provided with a plurality of patches at intervals of plastic filler adapted when subjected to pressure in a shoe bottom cavity to spread by flowing laterally beyond their original areas.

10. The herein described shoe filler material, comprising a plastic interior of spreadable filler material and an enclosing non-sticky extensible protector entirely surrounding the same for convenient shipping and handling.

11. As an article of manufacture, a shoe filler piece of non-spreadable supporting material provided on at least one side with spaced elevations containing spreadable filler material confined in an easily ruptured coating and adapted when the coating is ruptured under pressure to spread in the shoe bottom cavity.

12. As an article of manufacture, a shoe filler piece comprising spaced masses of spreadable filler material adapted when subjected to pressure in a shoe bottom cavity to spread by flowing laterally beyond their original areas.

13. As an article of manufacture, a shoe filler piece comprising spaced masses of spreadable filler material, and an easily ruptured coating normally covering said masses, said coating being adapted when ruptured under pressure to permit said masses of filler material to spread in the shoe bottom cavity.

14. As an article of manufacture, a multilayer shoe filler piece comprising at least one layer shaped to provide spaced cavities, and a spreadable filler material within said cavities adapted when subjected to pressure in a shoe bottom cavity to escape from said spaced cavities and spread in the shoe bottom cavity.

15. An article of manufacture comprising a filler piece of non-spreadable material provided with a plurality of distinct separated areas of plastic filler adapted when subjected to pressure in a shoe bottom cavity to spread by flowing laterally beyond their original areas.

Signed by me at Boston, Massachusetts, this fourth day of August, 1927.

ALFRED H. AVERY.